US006089192A

United States Patent [19]

Gent

[11] Patent Number: 6,089,192

[45] Date of Patent: Jul. 18, 2000

[54] APPARATUS TO FACILITATE SHEARING AND ALLIED OPERATIONS ON ANIMALS

[76] Inventor: Russell N. Gent, Totara Grove, Koromiko, Picton, New Zealand

[21] Appl. No.: 09/082,948

[22] Filed: May 21, 1998

[30] Foreign Application Priority Data

Jun. 27, 1997 [NZ] New Zealand ........................... 328204

[51] Int. Cl.[7] ..................................................... A01K 15/04

[52] U.S. Cl. .......................... 119/723; 119/724; 119/752; 119/756

[58] Field of Search .................................... 119/723, 722, 119/724, 751, 752, 753, 754, 755, 756, 600, 601; 452/54, 55

[56] References Cited

U.S. PATENT DOCUMENTS

| | | | |
|---|---|---|---|
| 352,262 | 11/1886 | Phelps . | |
| 407,610 | 7/1889 | Price . | |
| 2,458,582 | 1/1949 | Flohr, Jr. . | |
| 2,960,966 | 11/1960 | Monson . | |
| 2,967,510 | 1/1961 | Stoody . | |
| 3,732,847 | 5/1973 | Andersen | 119/753 |
| 3,892,204 | 7/1975 | Belkin . | |
| 3,970,046 | 7/1976 | Boggs . | |
| 4,214,555 | 7/1980 | Sawby . | |
| 4,292,931 | 10/1981 | Hopkins | 119/723 |
| 4,309,964 | 1/1982 | Young . | |
| 4,312,300 | 1/1982 | Hopkins . | |
| 4,459,941 | 7/1984 | Moffatt | 119/103 |
| 4,590,887 | 5/1986 | Holopainen | 119/723 |
| 4,892,062 | 1/1990 | Elford | 119/729 |
| 5,163,383 | 11/1992 | Roy | 119/722 |
| 5,915,334 | 6/1999 | Cummings et al. | 119/723 |

OTHER PUBLICATIONS

Kean Deer Yards brochure, Dec. 6, 1997.

*Primary Examiner*—Peter M. Poon
*Assistant Examiner*—Yvonne R. Abbott
*Attorney, Agent, or Firm*—Andrus, Sceales, Starke & Sawall

[57] ABSTRACT

The invention relates to an apparatus for restraining an animal, comprising (1) an animal receiving table pivotable between a substantially vertical position and a working position which is spaced above the ground, and (2) an animal restraint pad associated with the table and adapted to be moved in both the vertical position and the working position between an open position and a position whereby it can restrain an animal against the table. The invention also relates to a method for restraining the animal.

9 Claims, 6 Drawing Sheets

21 5 16 3 7 17 8 18 18 12 14 1 25

APPARATUS TO FACILITATE SHEARING AND ALLIED OPERATIONS ON ANIMALS

FIELD OF THE INVENTION

This invention relates to animal husbandry and in particular to apparatus to assist in the shearing and care of fibre producing animals.

BACKGROUND OF THE INVENTION

Certain animals and in particular alpacas and llamas, require particular techniques and attention during the shearing process and also when attending to minor items such as trimming toe nails, inspection of teeth and the like. The shearing of sheep requires a different technique from that required for shearing, for instance, alpacas or llamas. To shear a sheep, the shearer generally sits the sheep on the floor and stands astride the sheep for much of the shearing process. This is not possible when shearing alpacas and llamas for example, because an alpaca or llama is considerably larger than a sheep and because of the basic temperament of these animals. The size of the animal also means the shearer must adopt what is often an uncomfortable posture which can lead to physical strain and early fatigue.

When shearing sheep, the fleece is generally allowed to fall onto the floor where it is liable to pick up contamination such as debris and the like that may lie on the floor and that contamination has to be separated from the fleece at a later date. Further, allowing alpaca and llama fibre to fall to the floor causes fibre from the different parts of the animal having different grades to become mixed. Because of the higher cost of alpaca and llama fibre, it is sound practice to avoid as much as possible the risk of such contamination and also to avoid mixing fibre of different grades.

It is apparent that a method and apparatus by which an animal, particularly an alpaca, can be captured and restrained will considerably facilitate the task of shearing and of attending to other items referred to above.

Other desirable requirements are to improve the quality control, to ensure the safety of the animal and to facilitate the whole operation and in particular to enable the animal to be sheared without unduly stressing the animal.

OBJECT OF THE INVENTION

It is therefore an object of this invention to provide an apparatus and/or method that will minimise the above disadvantages and enable desirable advantages to be obtained.

DISCLOSURE OF THE INVENTION

Accordingly, one form of the invention may be said to comprise apparatus to restrain an animal, comprising:

- an animal receiving table pivotable between a substantially vertical position and a working position (usually a substantially horizontal position) which is spaced above the ground, and
- an animal restrain pad associated with the table and adapted to be moved in both the vertical position and the working position between an open position and a position whereby it can restrain an animal against the table.

Preferably the animal restraint pad comprises a frame and a cushion so constructed that the pad can be pivoted between a restraining position in which the cushion will lie adjacent to and substantially parallel to the table, or pivoted to an open position in which the cushion is spaced form the table.

Preferably means such as ties or straps are provided which are attachable to the legs of an animal placed on the table in its working position, and the restraint pad is moved to its open position to allow access to the animal.

Preferably means are provided to enable the animal to be turned over on the table.

Another form of the invention comprises a method for shearing an animal comprising:

- restraining an animal between a table top in a substantially vertical position and a restraint pad associated with the table top;
- pivoting the table top to a working position spaced above the ground, the animal remaining restrained on the table top due to restraint by the restraint pad;
- moving the restraint pad to a position leaving the animal accessible to a shearer; and
- shearing the animal while on the table top.

BRIEF DESCRIPTION OF THE DRAWINGS

Preferred forms of the invention will now be described with the aid of the accompanying drawings wherein.

DESCRIPTION OF THE PREFERRED EMBODIMENTS

Figure 1:
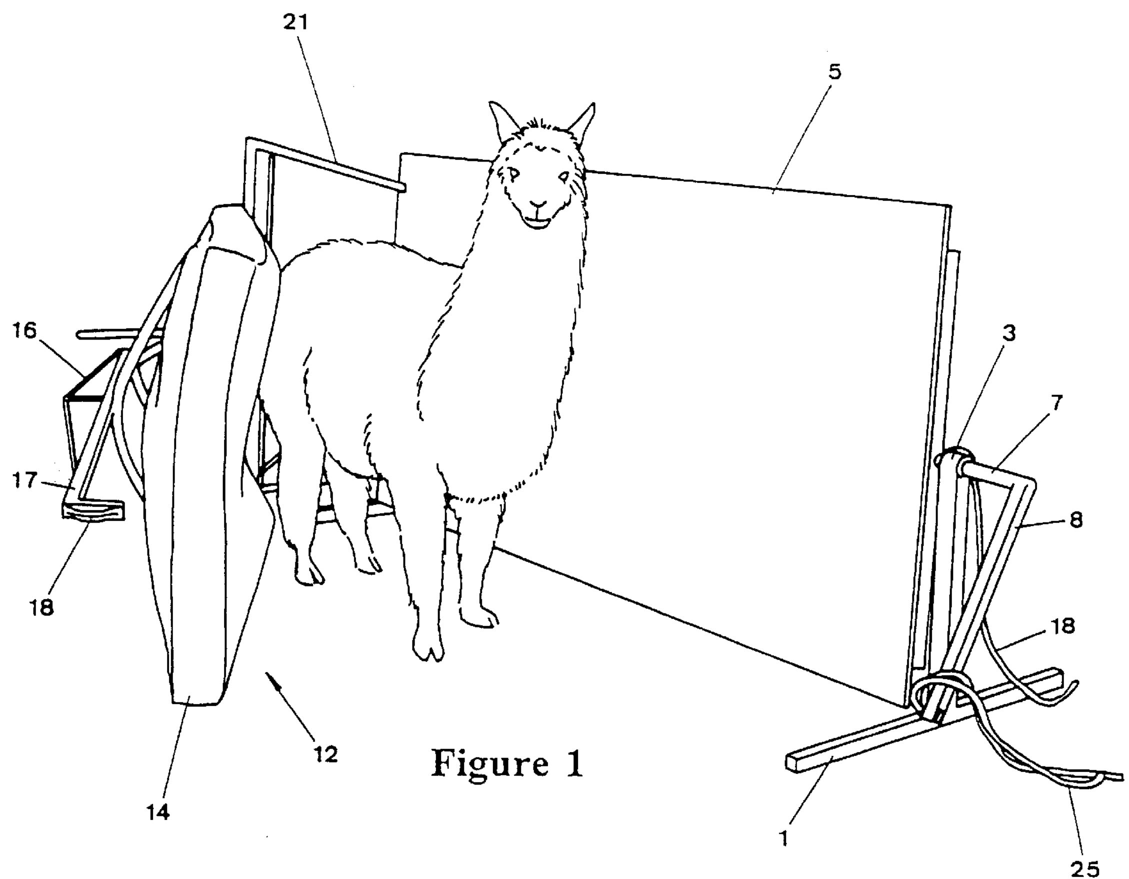
FIG. 1 is a view of an apparatus of the present invention and of an animal immediately prior to being restrained by the apparatus.
Figure 2:
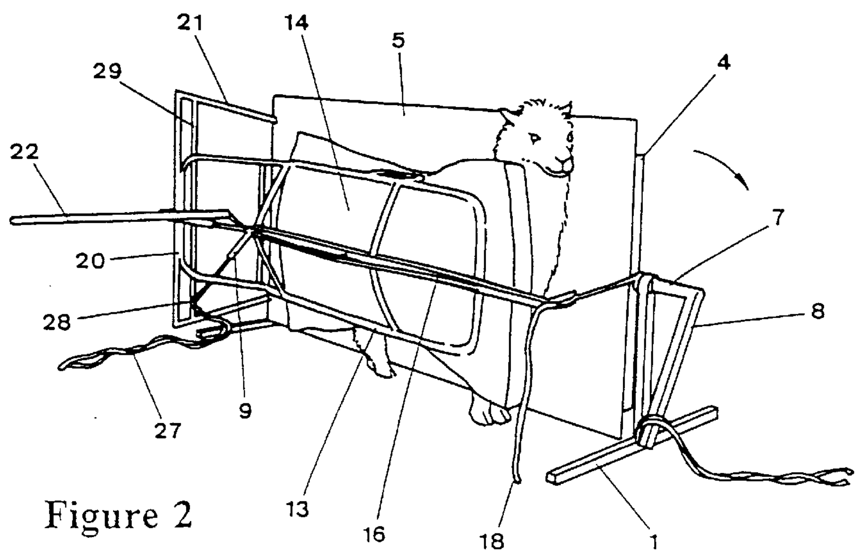
FIG. 2 is a view showing the animal still on its feet but in a restrained position.
Figure 3:
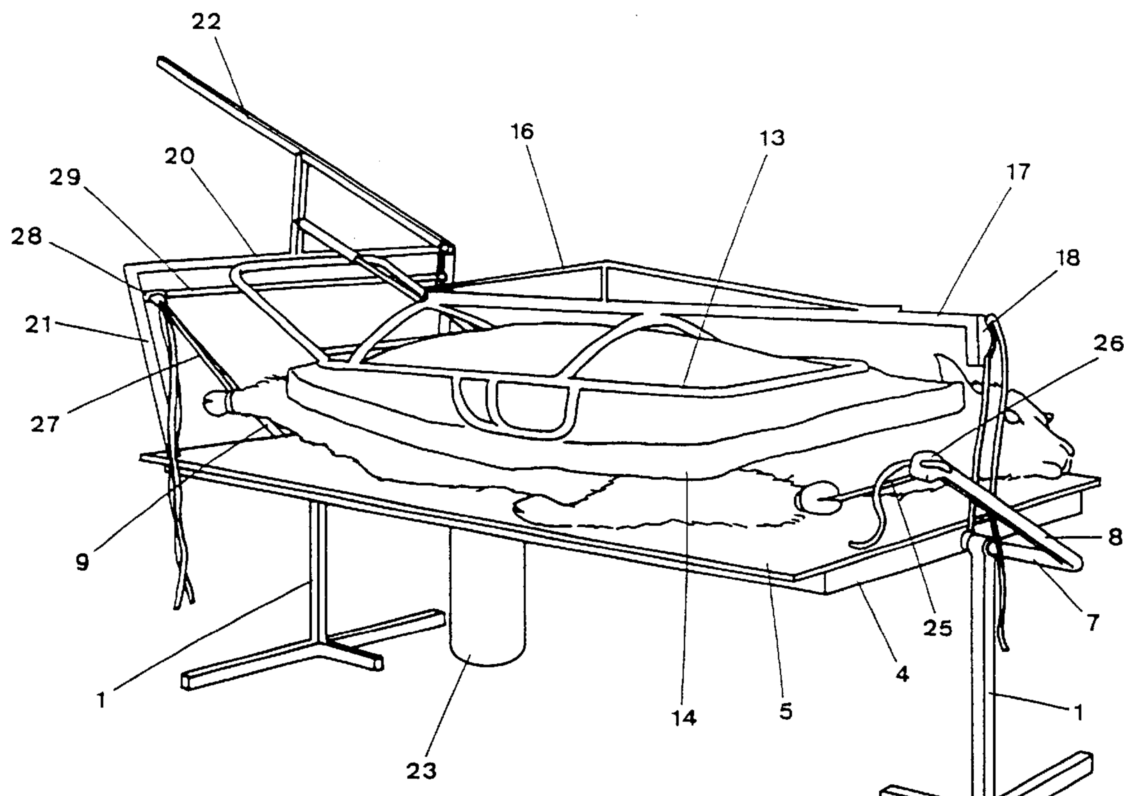
FIG. 3 is a view showing the apparatus and the animal after having being rotated to a horizontal position with the animal still restrained by the restraining mechanism.
Figure 4:
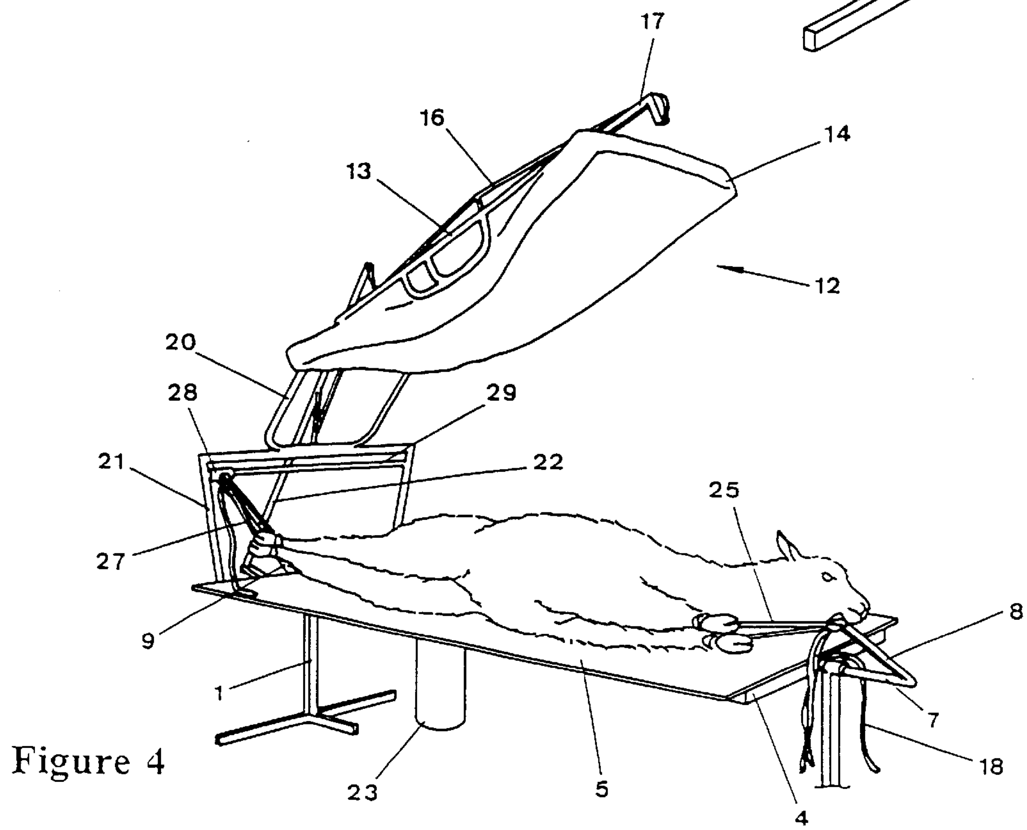
FIG. 4 is a view of the animal lying on the table of the apparatus with the restraining mechanism raised and the legs of the animal restrained.

Referring to FIGS. 1–4, the table has two legs 1 which are joined in a spaced apart relationship by a hollow mandrel (not shown) which can rotate in sleeves 3 fixed to the legs. The mandrel includes a support frame 4 which is fixed to the mandrel so that when the mandrel rotates in the sleeves 3, the frame will rotate with the mandrel. A sheet of rigid material such as plywood or other suitable weather-proof material is attached to the table support frame to form a table 5. The arrangement is such that the table top can be pivoted between the loading or unloading position indicated in FIGS. 1 and 2 and a working position indicated in FIGS. 3 and 4. Locking means, not shown in the drawings, are provided so that when the table is pivoted to the working position as indicated in FIGS. 3 and 4, the work surface of the table will be essentially horizontal and the means can then be operated to maintain the table in that position or release the table from that position.

An axle 7 passes through the sleeve 3 and through the bore of the mandrel to extend out of either end of the mandrel. An operating lever 8 is attached to the axle 7 at one end of the axle and a slave lever 9 is attached to the other end of the axle 7 in a manner that the operating lever 8 and the slave lever 9 will extend substantially radially from either end of the axle 7. Consequently when either the operating level 8 or the slave lever 9 is moved, both levers will move simultaneously.

The apparatus also includes an animal restraint pad 12 which consists of a frame 13 which can conveniently be formed from metallic tubing or the like and which is of an essentially rectangular form and is so shaped that it can receive and retain a cushion 14. Preferably the cushion 14 comprises a resilient core, of for instance a foamed plastic material, which is suitably covered by a hard-wearing material such as sheet plastics (eg vinyl) or the like which fully envelopes the core. The animal restraint pad also includes an overhead gantry 16 which includes an extension 17 which can co-operate with a hold-down tie 18 which may conveniently be a rope or the like, one end of which can be attached to the table so that the tie 18 can be clipped to the extension 17 by means of a jam cleat or the like such as is known in the art.

The other end of the frame 13 is attached to a lifting frame 20 which is pivoted to stanchions 21 which project from the table support frame. The lifting frame includes a handle extension 22 which is so constructed that when weight is exerted on the outer end of the handle extension, the animal restraint pad 12 can be pivoted to the raised position shown in FIG. 4 or can be lowered to the position shown in FIG. 3. When in the raised position, a tie rope (not shown in the drawings) can be connected between the handle extension 22 and the frame to retain the pad in the raised position. To lower the restraint pad, the tie rope is released from the handle extension and the frame 13 with the cushion can be lowered. When in the position shown in FIG. 3 and when an animal is to be restrained on the table as will be further described later, the pad can be retained in that position by applying the hold-down tie 18 to the extension 17 to thereby retain pressure of the animal restraint pad against the animal in a manner indicated in FIG. 3.

To utilise the apparatus, the table is pivoted to the loading/unloading position as indicated in FIG. 1 and the animal restraint pad is moved to the open position which is also shown in FIG. 1. The animal to be treated is led into the area between the animal restraint pad 12 and the table 5 and is positioned as indicated in FIG. 1. The animal restraint pad 12 is then closed against the animal such as by pulling on the extension 17 until the animal is snugly imprisoned between the tabletop 5 and the animal restraint pad. The hold-down tie 18 is then attached to the extension 17 to retain the pad against the animal. When in this position, the table 5 can be manually rotated so the animal is lifted off the ground and the table will then adopt the working position shown in FIG. 3. The means to lock the table in this position can be made to operate either automatically or manually.

The front legs of the animal are then restrained by attaching a leg rope 25 to the animal's legs and attaching the other end of the rope to a cam cleat 26 which is located on the operating lever 8. The rear legs of the animal are similarly restrained by a leg rope 27 which is attached by means of a cam cleat to a slide 28 which is located on a cross-member 29. Sufficient slack is taken out of the leg ropes 25 and 27 that movement of the legs of the animal is restrained without exerting strain on the animal.

When the legs of the animal have been secured, the hold-down tie 18 is released and the animal restraint pad is pivoted upwardly to the raised position indicated in FIG. 4. When in this position the animal will tend to lie quietly on the table, and the shearing operation or other animal care can proceed. To turn the animal from the side on which it is lying to the other side, the slide 28 is grasped and is pulled towards the other end of the cross-member 29. Since the slide 29 is connected to the slave lever 9, this will pivot the slave letter 9 which is attached to the operating lever 8 through the axle 7 and this movement will lift the animal's legs and will tend to rotate the animal on the table. At this stage, it is desirable for an operator to assist the animal by holding its head to ensure the rotation of the animal is comfortable for the animal. Alternatively the head may be strapped down (not shown).

When the care of the animal is complete, the animal restraint pad is again lowered to the position shown in FIG. 3 and the hold-down tie operated to retain the pad in that position. The table lock mechanism can then be released so that the table can be rotated to the vertical position as indicated in FIG. 2. When the animal is standing on its feet, the hold-down tie can be released from the extension 17 to thereby allow the animal restraint pad to be pivoted away from the table to allow the animal to move free of the table.

The particular advantages of the mechanism described are that a minimum amount of energy is required to place the animal on the table because the animal is able to walk into the area bounded by the tabletop and the animal restraint pad 12. Once in that position, the restraint pad is clamped closed and it is merely necessary to rotate the table to lift the animal to a convenient position. As is apparent from the drawings, the size of the table and the point of pivoting of the table is arranged that when the animal is standing against the table or it is lying on the table, the centre of gravity of the animal will essentially correspond with the point of pivoting. Consequently the rotation of the table with the animal restrained by the restraint pad between the loading/unloading position and the working position is facilitated. Because of the height of the table above the ground, when it is in the working position, the shearing and other operations that need to be undertaken are greatly facilitated because the person doing the shearing or other work on the animal is able to work at a convenient height.

As indicated in FIGS. 1 to 4 the table is preferably of a larger size than the animal so that any fibres shorn from the animal can be placed on or allowed to drop on the table where they can be removed for grading, storage and the like. Because the fibres do not contact the ground, the likelihood of contamination of the fibres by debris is minimised.

Preferably means are provided to assist in the stability of the table. One such means, although not shown in the drawings, would consist in passing spikes or the like through or onto the bases of the legs of the table and into the ground. A counter-weight 23 can be hooked to the underside of the table to counter the tendency of the weight of the animal to tilt the table.

As a result of the invention, the animal is maintained in a highly accessible position which can be adjusted to for instance waist height of the shearer, to thereby allow the shearer the maximum freedom in the shearing operation with a minimum strain of the back and the knees of the shearer. Furthermore because of the nature of the table on which the animal is lying and of the relative size of the table in comparison with the animal, contamination of the cut fibres is minimised while the separation and grading of the fibres is facilitated.

Figure 5:
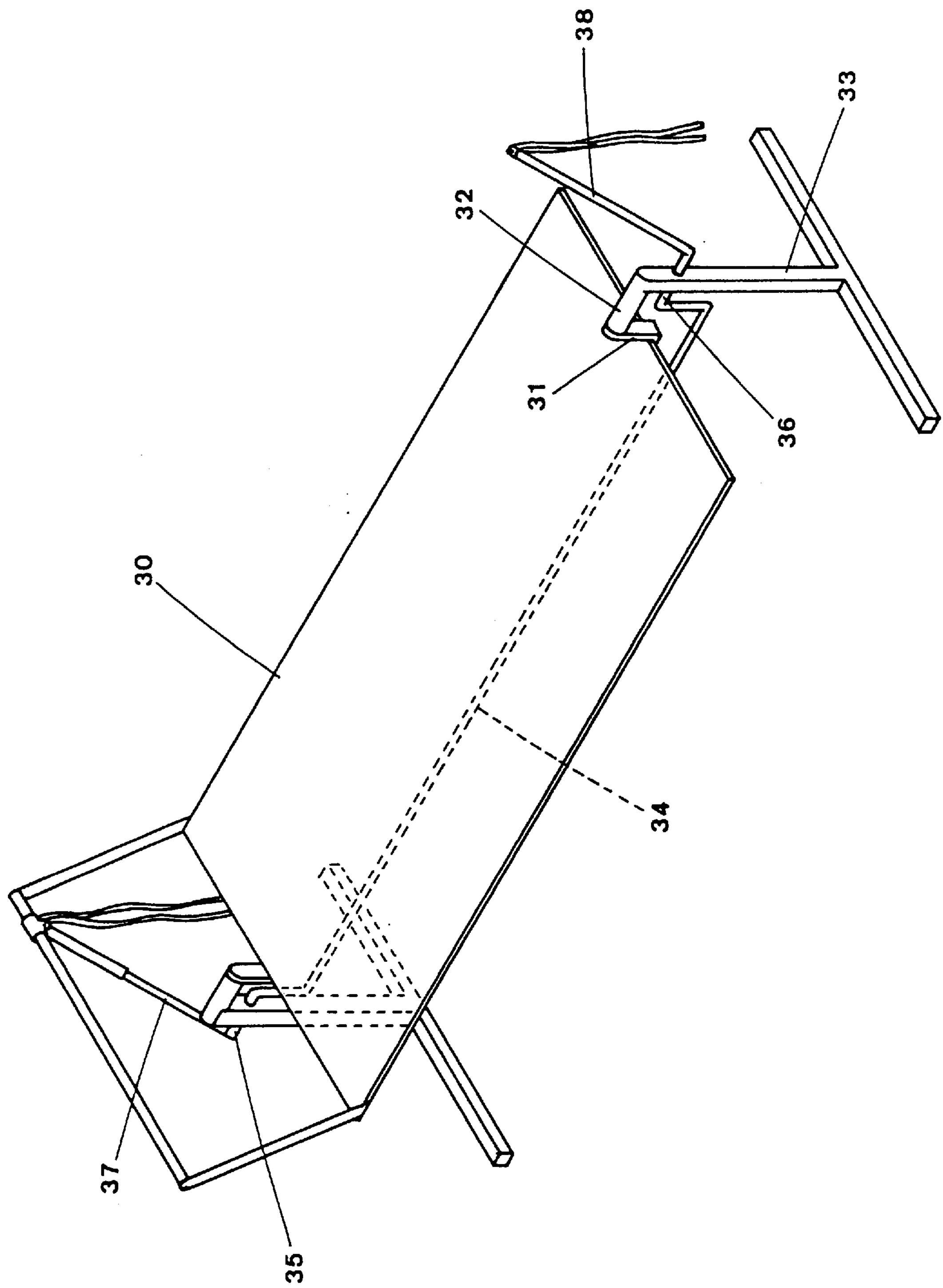
FIG. 5 shows a variant of the apparatus of FIGS. 1–4 in which the table level in the horizontal position is lower than the point at which it is pivoted.

FIG. 5 shows a variant of the above embodiment of the invention for use with larger animals. The tabletop 30 pivots about axles which are at each end of the table. The axles are held in position by supports 31 and project outwards centrally from each end of the tabletop 30 above the level of the tabletop (when horizontal). The axles are received by sleeves 32 on the legs of the table 33. The mechanism for turning over the animal uses a rod 34 which passes beneath the table which is joined to axles 35 and 36 which pass through the legs at each end of the table at approximately the same height as the table top. The rod passing beneath the table is parallel and continuous with the axles 35 and 36 and offset by bends so as to pass under the tabletop 30. The ends of axles 35 and 36 projecting outwards from the table are joined to a slave lever 37 and an operating lever 38 which may be used to turn the animal in the same manner as used with the apparatus of FIGS. 1 to 4.

Figure 6:
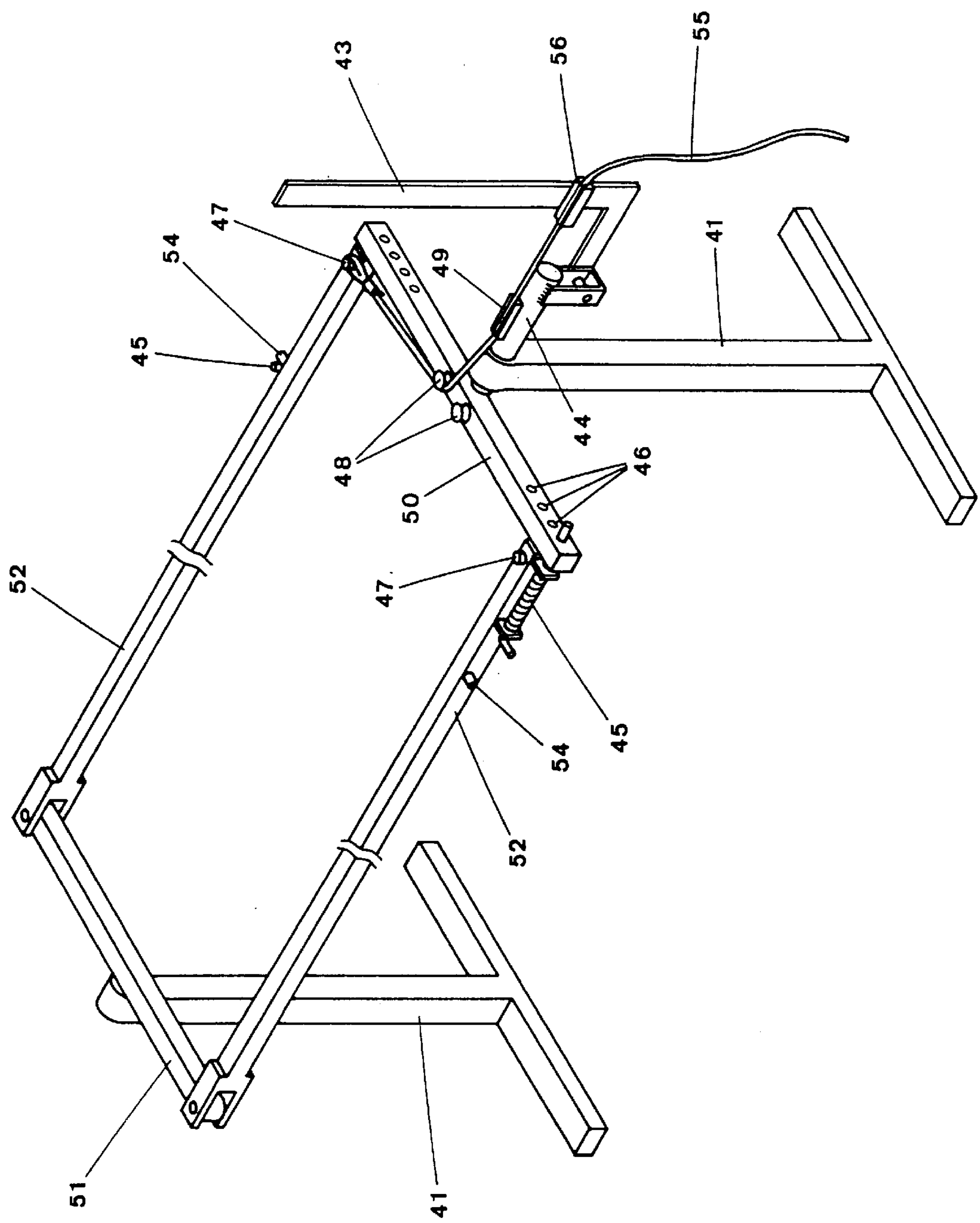
FIG. 6 shows the framework of a further apparatus of the invention.
Figure 7:
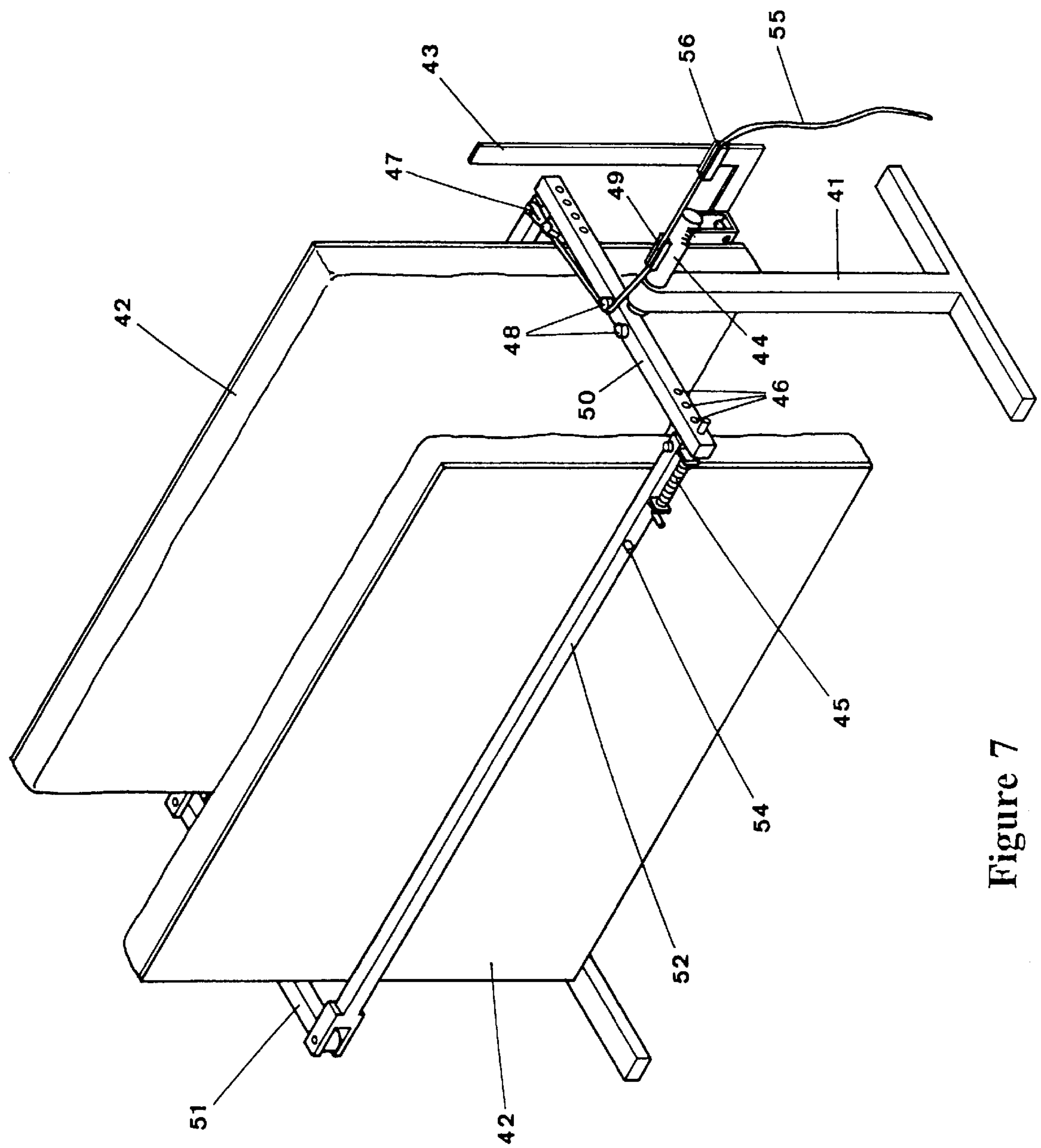
FIG. 7 is a view of the further apparatus of the invention with the restraining means in the vertical position.
Figure 8:
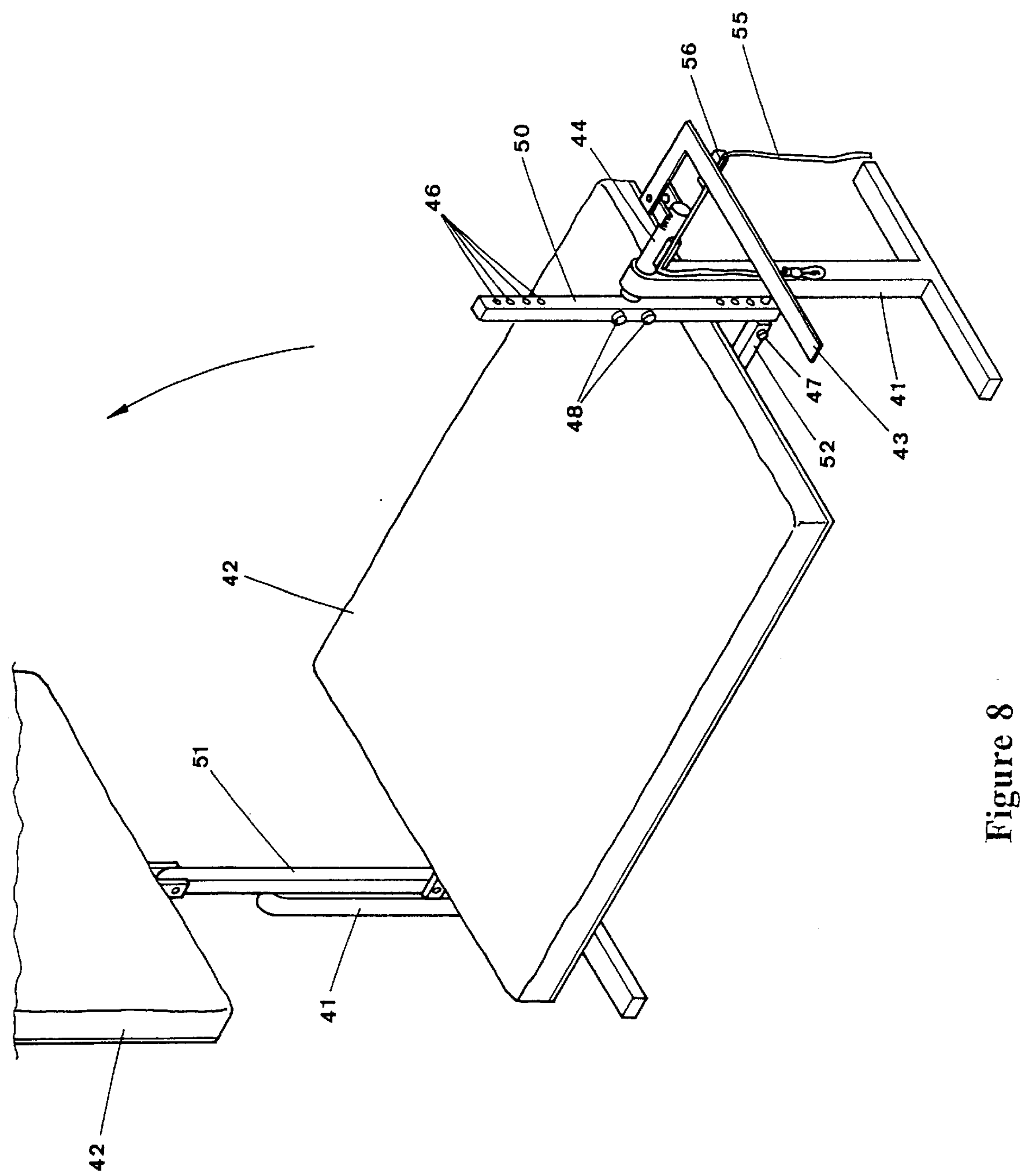
FIG. 8 is a view of the apparatus with one restraining means functioning as a table top and with one of the restraining means raised.

FIGS. 6 to 8 illustrate a further embodiment of the invention. At each end of the apparatus there are legs 41. These are pivotally attached at each end to a rectangular frame consisting of end pats 50 and 51 and side parts 52. The end parts 50 and 51 each have an axle projecting outwards centrally to pivotally connect with the legs 41. One end part 51 is hingedly joined to the two side parts 52 in such a manner that the side parts may pivot outwards from the rectangle when freed from the other end part 50.

The animal is held in position by a pair of padded walls 42 attached to the side part 52 of the rectangle frame. Each restraining wall 42 is padded on its inner side. One restraining wall 42 and the attached side part of the rectangular frame may be swung outwards when freed from its connection with end part 50 of the rectangular frame. This allows entry of the animal to the apparatus. The restraining wall 42 is returned to the closed position to restrain the animal. Once an animal is firmly restrained the restraining walls 42 may be rotated from a vertical position (FIG. 7) to a horizontal position with the animal firmly restrained between them. At this point the feet and neck of the animal may be tied down. Once an animal has been tied down the upper restraining wall 42 may be released and pivoted from the end at which the frame side part 52 is hingedly attached to allow access to the animal (see FIG. 8). The lower restraining wall 42 can now function as a table top. Shearing of one side of the animal may then take place. Then the wall 42 may be returned to the restraining position. The pair of padded walls 42 may be rotated through 180 degrees so that the other wall 42 may be released in the same manner as the first so as to allow shearing of the other side of the animal.

Turning of the padded walls is achieved using a lever 43 attached to an axle 44 when the ends of the side parts 52 and the end part 50 of the rectangular frame are attached by using spring bolts 45. The bolts 45 on side parts 52 are received in holes 46 in the end part 50 of the rectangular frame. There are a plurality of holes 46 so that the gap between the two padded walls may be varied. When a spring bolt 45 is latched into an open position using catch 54, a padded wall 42 can be opened from the apparatus. This will take place either when the walls 42 are vertical to allow entry or exit of an animal or in the horizontal position. When the restraining walls 42 are horizontal the upper wall is released so that it can be pivoted out of the wall to allow access to the animal.

To assist in closing the walls on an animal a rope 55 is attached to a bolt 47 protruding from a side part 52 of the rectangular frame and passed around a pulley 48 located centrally on the end part 50 of the rectangular frame and through a fixed cleat 49 and from there to a jam cleat 56 on the shaft of the lever 43. The shaft of the lever 43 is attached so that it may be pivoted outwards thus providing leverage for pulling on the rope to close the padded wall on an animal. The apparatus is provided with locking means (not shown in the drawings) so that when the walls 42 are pivoted to a working position (FIG. 8) the surface of the table will be reversibly locked into position.

This apparatus has the disadvantage that both surfaces functioning as table tops are padded but has advantages for use with larger animals.

Having read the specification, it will be apparent to those skilled in the particular art that various modifications and amendments can be made to the specific embodiments described. All such amendments and modifications are intended to be included within the scope of the accompanying claims.

What is claimed is:

1. Apparatus to restrain an animal, comprising:

an animal receiving table pivotal about a longitudinal axis between a substantially vertical position and a working position in which the animal receiving table is spaced above the ground and can support an animal on its side on the table;

an animal restraint pad associated with the table and adapted to be moved in both the vertical position and the working position between an open position in which the pad is spaced from the table and a restraining position in which the restraint pad can restrain an animal against the table, and ties or straps attachable to the legs of an animal on the table to hold the animal on the table when the table is in its working position and the restraint pad is in the open position to enable to at least a side of the animal.

2. An apparatus of claim 1 wherein the working position is a substantially horizontal position.

3. An apparatus of claim 1 further comprising animal turning means allowing the animal to be turned over on the table.

4. An apparatus of claim 3 wherein the animal turning means comprises ropes or ties attached to movable elements at each end of the table whereby the movable elements and the ropes or ties in one position hold the legs of the animal in a position towards one edge of the table and in a second position hold the legs of the animal towards the opposite edge of the table and wherein movement between the two positions moves at least one pair of legs from one side of the animal upwards from the table and to the other side of the table.

5. Apparatus of claim 4 wherein at least one movable element comprises a rope receiving member pivotally attached to the apparatus near one end of the table and pivotable in a plane substantially perpendicular to the table and adapted to receive a tie at a point remote from where it is pivotally attached to the apparatus.

6. Apparatus according to claim 1 wherein the table and animal restraint pad when the restraint pad is in its restraining position can be rotated together about said longitudinal axis through substantially 180° to a second working position in which the restraint pad is lowermost and can support an animal on its side and the table is uppermost and wherein in said second working position the table may be pivoted away from the restraint pad to allow access to another side of the animal.

7. Apparatus according to claim 6 wherein the table comprises a cushion or pad.

8. A method for shearing an animal comprising:

restraining an animal between a table top in a substantially vertical position and a restraint pad associated with the table top;

pivoting the table top to a working position spaced above the ground, the animal remaining restrained on the table top due to restraint by the restraint pad;

moving the restraint pad to a position leaving the animal is accessible to a shearer; and shearing the animal while on the table top.

9. A method as claimed in claim 8 wherein the animal is tied to the table before moving the restraint pad to make the animal accessible to the shearer.

* * * * *